Patented Apr. 8, 1947

2,418,498

UNITED STATES PATENT OFFICE 2,418,498

ORGANIC SOLVENT SOLUBLE DERIVATIVES OF CELLULOSE AND PROCESS FOR PREPARING THE SAME

William James Burke, Marshallton, Del., assignor to E. I. du Pont de Nemours & Company, Wilmington, Del., a corporation of Delaware No Drawing. Application June 15, 1944, Serial No. 540,533

17 Claims. (Cl. 260—226)

This invention relates to polymeric organic materials and more particularly to modified hydroxylated polymers.

This invention has as an object the preparation of new polymeric materials. A further object is the modification of hydroxylated polymers, i. e. hydroxyl containing, macromolecular or high molecular weight materials. A further object is the preparation of linear, high molecular weight, polymeric oxymethyl ethers which are suitable for use in the preparation of films, fibers, coatings and plastics. Another object is to prepare organic, solvent-soluble oxymethylcellulose acetate derivatives. Other objects will appear hereinafter.

These objects are accomplished by this invention wherein a linear, high molecular weight, i. e. macromolecular, organic solvent-soluble, hydroxyl containing polymer is reacted in solution in a liquid organic solvent with formaldehyde and a monomeric hydroxyester in the presence of an acidic catalyst. The invention includes within its scope the oxymethyl ethers thus prepared.

This invention is carried out by reacting in solution an organic solvent-soluble, hydroxyl containing polymer with formaldehyde and an organic hydroxyester for one to twenty-four hours at 25° to 60° C. in the presence of an acidic catalyst.

The more detailed practice of the invention is illustrated by the following examples wherein parts given are by weight. There are, of course, many forms of the invention other than these specific embodiments.

Example I

To 35 parts of dry cellulose acetate (56% combined acetic acid; 0.5 hydroxyl per glucose unit) dissolved in 130 parts of glacial acetic acid are added with stirring 30 parts of methyl hydroxyacetate (33 mols), 7.5 parts of paraformaldehyde (25 mols), and 0.35 part of p-toluenesulfonic acid in 7 parts of acetic acid. The solution is heated at 50° C. and 6.5 parts of acetic anhydride is added after twenty-four hours. After forty-eight hours at 50° C., 5 parts of sodium acetate in 40 parts of 50% aqueous acetic acid is added and the solution diluted with 350 parts of 50% acetic acid. The resulting solution is poured slowly with stirring into 1,500 parts of water. The precipitate is washed thoroughly with water, and dried at 65° C. The white product analyzes for 1.34% combined formaldehyde. This corresponds to the introduction of 0.12 carbomethoxy-methoxymethyl group per glucose unit. The reaction is believed to occur as indicated below.

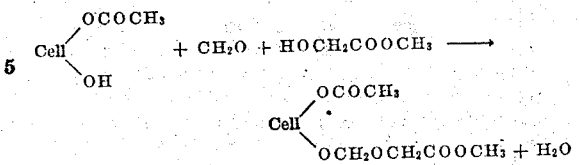

Clear, bright films of carbomethoxymethoxy-methylcellulose acetate are readily cast from chloroform-methanol (9:1) solution.

It is to be noted that when cellulose acetate films prepared from solutions containing methyl hydroxyacetate and formaldehyde in the proportions used above, are heated at 100° C. for 30 minutes in the presence of p-toluenesulfonic acid as catalyst, insoluble, crosslinked products are obtained. Similar results are obtained when methyl hydroxyacetate is replaced with higher boiling organic hydroxy esters.

Example II

To 35 parts of dry cellulose acetate (56% combined acetic acid; 0.5 hydroxyl per glucose unit) in 130 parts of glacial acetic acid is added with stirring 32 parts of ethylene chlorohydrin, 10.5 parts of para-formaldehyde, and 0.35 part of p-toluenesulfonic acid in 7 parts of glacial acetic acid. The reaction mixture is stirred at 50° C. and in a short time the para-formaldehyde dissolves. After one hour 6.5 parts of acetic anhydride is added and the reaction mixture is kept at 50° C. for twenty-four hours. The product, isolated as described in Example I, analyzes for 1.60% combined formaldehyde. This corresponds to the introduction of 0.15 beta-chloroethoxymethyl group per glucose unit. The reaction is illustrated by the following equation.

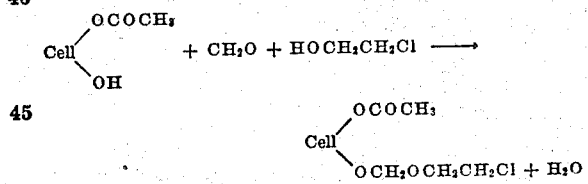

Clear, bright films of beta-chloroethoxymethyl-cellulose acetate are readily obtained from chloroform-methanol (9:1) solution.

When 4 parts of 6% sodium methylate in methanol is added with stirring to two parts of the beta-chloroethoxymethylcellulose acetate dissolved in 38 parts of dioxanemethanol (30–8), gelation occurs very rapidly. The white precipitate is washed with methanol until free of alkali and dried. The product is insoluble in cuprammonium hydroxide and solvents for the original polymer. A probable reaction is given below

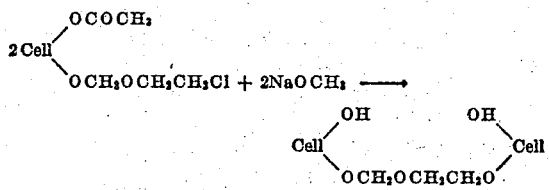

Crosslinked products are also obtained when films and fibers of beta-chloroethoxymethylcellulose acetate are deacetylated heterogeneously. This provides a means of obtaining crosslinked, resilient, cellulosic fibers under mild conditions which do not promote degradation.

Any organic solvent-soluble, linear, high molecular weight, i. e. macromolecular polymer containing unsubstituted alcoholic hydroxyl groups can be used in this invention. Suitable hydroxyl-containing polymers include cellulose acetate, cellulose nitrate, ethylcellulose, polyvinyl alcohol, hydrolyzed vinyl acetate interpolymers and polyvinyl butyral. Cellulose esters and ethers having 0.1 to 1.5 hydroxyl groups per glucose unit, including cellulose acetate and particularly secondary cellulose acetate, are especially suited for use in this invention since they react with exceptional ease.

Hydroxyesters of both organic and inorganic acids are suitable for use in this invention. Hydroxyesters having aliphatic hydrocarbon radicals containing eight or less carbon atoms are preferred since they react more efficiently and in general are less expensive and more readily available. Suitable hydroxyesters include benzyl hydroxyacetate, glycerol diacetate, glycerol bromohydrin, hydroxyethyl trichloroacetate, hydroxyethyl benzoate, dodecyl hydroxyacetate, ethyl malate, beta-fluoroethanol, beta-cyanoethanol, beta-methoxyethyl hydroxyacetate, hydroxyethyl toluenesulfonate, mannitol monostearate, and castor oil. Alkyl esters of hydroxy fatty acids form a preferred subgroup. These give the preferred carboalkoxyalkoxymethyl cellulose esters and particularly the carboalkoxyalkoxymethylcellulose acetates, e. g. carbomethoxymethoxymethylcellulose acetate. Another desirable class of hydroxy esters is that of the halohydrins. These give the haloalkoxymethylcellulose esters such as the chloroalkoxymethylcellulose acetates, e. g. beta-chloroethoxylmethylcellulose acetate.

Although any aliphatic aldehyde can be used in this invention, formaldehyde is preferred because of its outstanding reactivity. Substances such as trioxane or para-formaldehyde, which liberate formaldehyde, can be employed in place of formaldehyde.

In general at least one mol of the hydroxyester is used per mol of formaldehyde, and it is preferable to use a 5% to 50% molar excess of hydroxyester in order to minimize the possibility of obtaining insoluble reaction products. From 0.1 to 10 mols or more of hydroxyester can be used per hydroxyl group in the polymer depending upon the type of product desired. However, in general it is preferable to use 1 to 4 mols of hydroxyester per hydroxyl group in the polymer since reaction proceeds readily under these conditions and the original polymer is substantially modified.

Strong acids or salts liberating strong acids under reaction conditions are effective catalysts for the reaction. Suitable catalysts include hydrogen chloride, sulfuric acid, p-toluenesulfonic acid, naphthalenesulfonic acids, ammonium chloride, and sodium hydrogen sulfate.

Suitable inert solvents include acetic acid, formic acid, dioxane, benzene, gasoline, methylene dichloride, carbon tetrachloride and dibutyl ether. The choice of the solvent will depend largely on the polymer used. For example, acetic acid is suitable for use with cellulose acetate, dioxane with ethylcellulose, and formic acid with polyvinyl alcohol. As has been indicated in the examples, the reaction must be conducted in solution if products are to be obtained which are soluble in the solvents for the untreated linear hydroxyl-containing polymer.

Since the presence of water lowers reaction efficiency, it is desirable to use dry reagents and solvents. In certain instances a greater degree of reaction is obtained by removing the water formed in the reaction. This can be done, for example, by azeotropic distillation or by the addition of an agent such as acetic anhydride, which is capable of combining with the water formed. Reaction occurs readily at a temperature of 15° to 100° C. or higher. Temperatures below 60° C. are generally preferred, particularly with cellulose derivatives, in order to avoid degradation and possible insolubilization of the polymer.

The products of the invention are organic-solvent-soluble, linear, high molecular weight polymers having as side chains ester substituted alkoxymethoxy groups. They are solids which are soluble in at least one organic solvent. The particular solvent required depends principally on the nature of the particular hydroxylated polymer that is used. For example, the derivatives of cellulose acetate are soluble in solvents such as glacial acetic acid or chloroform-ethanol (9:1) mixture; the derivatives of ethylcellulose are soluble in solvents such as dioxane and derivatives of polyvinyl alcohol are soluble in solvents such as formic acid. The solubility also depends, to some extent, on the particular ester substituent group. The products contain the groups —OCH$_2$O-ester attached to the polymer chain. These side chains are uniformly distributed over the linear polymer.

The principal advantage of the invention is that products are obtained which are soluble in organic solvents. When the reaction is carried out in the absence of a solvent, insoluble crosslinked products are obtained. The soluble products can be crosslinked by the process described in the second paragraph of Example II. However, this is not done until after the soluble product has been formed into the desired shaped article, for example, film or fiber. This process also provides a means for obtaining crosslinked, resilient cellulosic fibers under mild conditions which do not promote degradation.

The products of this invention are useful in the preparation of fibers, films, plastics and coating compositions.

The above description and examples are intended to be illustrative only. Any modification thereof or variation therefrom which conforms to the spirit of the invention is intended to be included within the scope of the claims.

What is claimed is:
1. A process for the preparation of organic solvent-soluble derivatives of hydroxyl-containing linear polymers of the class consisting of cellulose esters and cellulose ethers which comprises reacting, in solution in an inert liquid organic solvent, said hydroxyl-containing linear polymer with an aliphatic aldehyde and an organic hydroxy ester in the presence of an acidic catalyst.

2. A process for the preparation of organic solvent-soluble derivatives of hydroxyl-containing linear polymers of the class consisting of cellulose esters and cellulose ethers which comprises reacting, in solution in an inert liquid organic solvent, said hydroxyl-containing linear polymer with formaldehyde and an organic hydroxy ester in the presence of an acidic catalyst.

3. A process for the preparation of organic solvent-soluble derivatives of hydroxyl-containing linear polymers of the class consisting of cellulose esters and cellulose ethers which comprises reacting, in solution in an inert liquid organic solvent, said hydroxyl-containing linear polymer with formaldehyde and an organic hydroxy ester in the presence of an acidic catalyst for one to twenty-four hours at 25° to 60° C.

4. A process for the preparation of organic solvent-soluble derivatives of cellulose acetate which comprises reacting, in solution in a liquid organic solvent, cellulose acetate with formaldehyde and an organic hydroxy ester in the presence of an acidic catalyst for one to twenty-four hours at 25° to 60° C.

5. Process of claim 3 wherein a 5% to 50% excess of hydroxyester over formaldehyde, and 1 to 4 mols of hydroxyester per hydroxyl group of the polymer are employed.

6. An organic solvent-soluble hydroxyl-containing linear polymer of the class consisting of cellulose esters and cellulose ethers having cellulosic hydroxyl hydrogen thereof replaced by a methylene group in turn attached through oxygen to a monovalent radical containing an ester group.

7. An organic solvent-soluble monomeric polyhydric alcohol having one hydroxyl esterified and another replaced by —O—CH$_2$—O—R wherein R is the monovalent radical formed by the removal of a cellulosic hydroxyl from a hydroxyl-containing linear polymer.

8. An organic solvent-soluble carboalkoxyalkoxymethylcellulose ester.

9. An organic solvent-soluble carboalkoxyalkoxymethylcellulose acetate.

10. An organic solvent-soluble carbomethoxymethoxymethylcellulose acetate.

11. An organic solvent-soluble haloalkoxymethylcellulose ester.

12. An organic solvent-soluble chloroalkoxymethylcellulose acetate.

13. An organic solvent-soluble beta-chloroethoxymethylcellulose acetate.

14. An organic solvent-soluble monomeric polyhydric alcohol having one hydroxyl esterified and another hydroxyl replaced by —O—CH$_2$—O—R wherein R is the monovalent radical formed by the removal of cellulosic hydroxyl from a cellulose ether.

15. An organic solvent-soluble hydroxyl-containing cellulose ester having cellulosic hydroxyl hydrogen thereof replaced by a methylene group in turn attached through oxygen to an alkyl radical substituted by an ester group.

16. An organic solvent-soluble hydroxyl-containing cellulose derivative of the class consisting of cellulose ethers and esters having cellulosic hydroxyl hydrogen thereof replaced by a methylene group in turn attached through oxygen to a monovalent radical containing an ester group.

17. An organic solvent-soluble monomeric polyhydric alcohol having one hydroxyl esterified and another hydroxyl replaced by —O—CH$_2$—O—R wherein R is the monovalent radical formed by the removal of cellulosic hydroxyl from ethylcellulose.

WILLIAM JAMES BURKE.

REFERENCES CITED

The following references are of record in the file of this patent:

UNITED STATES PATENTS

| Number | Name | Date |
|---|---|---|
| 2,332,896 | D'Alelio | Oct. 26, 1943 |